(12) United States Patent
Adderly et al.

(10) Patent No.: US 8,854,555 B2
(45) Date of Patent: Oct. 7, 2014

(54) SYSTEM AND METHOD TO TOGGLE BETWEEN TWO OR MORE TELEVISION CHANNELS

(71) Applicants: Darryl Adderly, Morrisville, NC (US); Brian Murray, Raleigh, NC (US); Wenjian Qiao, Cary, NC (US); Prasad Kashyap, Apex, NC (US)

(72) Inventors: Darryl Adderly, Morrisville, NC (US); Brian Murray, Raleigh, NC (US); Wenjian Qiao, Cary, NC (US); Prasad Kashyap, Apex, NC (US)

(*) Notice: Subject to any disclaimer, the term of this patent is extended or adjusted under 35 U.S.C. 154(b) by 0 days.

(21) Appl. No.: 13/745,210

(22) Filed: Jan. 18, 2013

(65) Prior Publication Data

US 2014/0204277 A1   Jul. 24, 2014

(51) Int. Cl.
*H04N 5/50* (2006.01)

(52) U.S. Cl.
CPC ........................................ *H04N 5/50* (2013.01)
USPC ............ 348/731; 348/705; 348/706; 348/734; 348/725; 348/723; 348/570; 348/569; 348/473; 348/474; 348/432.1; 348/388.1; 348/563; 348/461; 348/463; 348/565; 725/32; 725/34; 725/35; 725/37; 725/38; 725/39; 725/40; 725/46; 725/56; 725/57; 725/61; 725/88; 725/94; 725/102; 725/120; 725/131; 725/136

(58) Field of Classification Search
USPC ......... 348/705, 706, 570, 731, 563, 565, 734, 348/725, 473, 474, 569, 70, 461, 463, 348/432.1, 388.1; 725/27, 32, 34, 35, 37, 725/38, 39, 40, 46, 56, 57, 61, 88, 94, 102, 725/120, 131, 136
See application file for complete search history.

(56) References Cited

U.S. PATENT DOCUMENTS

| | | | |
|---|---|---|---|
| 5,369,440 A | 11/1994 | Sussman | |
| 6,766,526 B1 * | 7/2004 | Ellis | 725/57 |
| 7,227,583 B2 | 6/2007 | Sin | |
| 7,487,523 B1 * | 2/2009 | Hendricks | 725/34 |
| 7,647,612 B1 | 1/2010 | Stark | |
| 7,957,381 B2 * | 6/2011 | Clermidy et al. | 370/392 |
| 8,150,035 B2 | 4/2012 | McClenny et al. | |
| 8,171,510 B2 | 5/2012 | Kamen et al. | |
| 8,201,196 B2 | 6/2012 | Michael et al. | |

(Continued)

FOREIGN PATENT DOCUMENTS

WO   2009113040 A2   9/2009

OTHER PUBLICATIONS

"How to Set a DirecTV Reciever [sic] to Change Channels Automatically." Viewed online Jan. 18, 2013, at http://www.ehow.com/how_4548864_set-directv-reciever-change-channels.html. 3 pages. eHOW.com.

(Continued)

*Primary Examiner* — Jefferey Harold
*Assistant Examiner* — Mustafizur Rahman
(74) *Attorney, Agent, or Firm* — Coats & Bennett, P.L.L.C.

(57) ABSTRACT

Systems and methods for toggling between television channels that appear on a display. A listing of channels is received from a user, with the channels being prioritized in an order of preference. One or more toggle types are also received from the user, with each toggle type further including a toggle trigger. In use, a channel is displayed on the display until a toggle trigger is detected. Once detected, the channel on the display is changed to another channel from the list of channels. This process may continue with the detection of another toggle trigger causing another changing of the displayed channel.

20 Claims, 9 Drawing Sheets

(56) References Cited

U.S. PATENT DOCUMENTS

| | | | |
|---|---|---|---|
| 2003/0066077 A1* | 4/2003 | Gutta et al. | 725/34 |
| 2004/0189879 A1* | 9/2004 | Read | 348/731 |
| 2006/0253330 A1* | 11/2006 | Maggio et al. | 705/14 |
| 2008/0060027 A1* | 3/2008 | Yang | 725/88 |
| 2008/0297669 A1 | 12/2008 | Zalewski et al. | |
| 2010/0002140 A1* | 1/2010 | Zhang et al. | 348/569 |
| 2010/0031286 A1 | 2/2010 | Gupta et al. | |
| 2011/0109801 A1 | 5/2011 | Thomas et al. | |
| 2012/0276982 A1* | 11/2012 | Ansari et al. | 463/23 |

OTHER PUBLICATIONS

"Home audio & video forum: Change TV channels automatically?" Online blog posts viewed Jan. 18, 2013, at http://forums.cnet.com/7723-7596_102-182841/change-tv-channels-automatically/. 5 pages.

"How does ReplayTV and Tivo skip ads? how do they know that ads started/ended?" Viewed online Jan. 18, 2013, at http://answers.yahoo.com/question/index?qid=1005120904141. 1 page.

Replaytv Online Support web page. Accessed Dec. 24, 2012, at http://www.digitalnetworksna.com/support/replaytv/default.asp.

Eisenburg, Anne. "Software that Listens for Lies". The New York Times. Article viewed online Dec. 24, 2012 at http://www.nytimes.com/2011/12/04/business/lie-detection-software-parses-the-human-voice.html?_r=0. Original publication Dec. 3, 2011, The New York Times.

International Search Report, International application No. PCT/US14/11974. Date of mailing: Jul. 8, 2014. ISA/US, Mail Stop PCT, Alexandria, VA.

* cited by examiner

| Toggle Option 31 | Toggle Type(s) 32 | Channels 33 | Toggle Trigger 34 | Start DateTime 35 | Duration 36 |
|---|---|---|---|---|---|
| 1 | Time Interval | 13, 22, 7 | 5 | Sat., 12.22.2012 at 9:00 am | 2 hours |
| 2 | Commercial | 17, 33, 164 | 0 | NOW | 1 hour |
| 3 | Vocal Cue | 1105, 1111, 1301, 1527 | 1, 3, 4 | Sun, 12.23.2012 at 1:00 pm | 3 hours |
| 4 | Time Interval or Commercial | 314, 267, 891, 902, 10 | 5 | Mon, 12.24.2012 at 8:00 pm | 4 hours |
| 5 | Commercial or Vocal Cue | 56, 733 | 6 | Tues, 12.25.2012 at 11:30 am | 30 minutes |
| 6 | Time Interval or Vocal Cue | 98, 147, 6, 3, 89, 14 | 10, 3 | Fri, 12.28.2012 at 5:30 pm | 90 minutes |
| 7 | Time Interval or Commercial or Vocal Cue | 1400, 1401, 1402, 1403, 1404, 1405, 1406 | 6, 1 | Thurs, 3.21.2013 at 12:00pm | 12 hours |

SYSTEM AND METHOD TO TOGGLE BETWEEN TWO OR MORE TELEVISION CHANNELS

FIELD OF THE INVENTION

The application is directed to a selecting television channels, and, more particularly, to toggling between channels based on predefined selection criteria.

BACKGROUND

Many television viewers are often faced with the dilemma of wanting to watch multiple listings simultaneously for various reasons. For example, different members of a family may not want to watch the same show, or two desired shows may be aired in the same time slot. For sports fanatics, multiple games of interest may be played during overlapping periods of time. Increasingly, multiple sporting events are being televised on several channels owned by one parent company. Examples include the Summer Olympics which are televised by NBCUniversal Media LLC, and the National Collegiate Athletic Association (NCAA) Men's Basketball Tournament televised by CBS Corporation. In both of the aforementioned examples, events and games are simultaneously broadcasted on numerous TV channels and websites associated with the respective companies.

In instances when there are just two conflicting shows, a viewer through a remote control can use the "previous channel" or "back" button to switch back and forth between channels. The switching may occur using various methods, such as during a commercial or after some time has elapsed. However, this methodology is not successful when there are three or more channels of interest.

Another option may include saving the desired channels to a "favorite's list" to allow one to either view the list of favorites to choose from or press the "fav" button to switch to the next channel (in ascending order) in the favorite's list to view. This manual process is predicated on someone remembering to change the channel occasionally.

SUMMARY

The present application is directed to a device and process for toggling between multiple television channels that appear on a display. A user is able to input information, such as various channels, priorities, start and duration times, and toggle options. The device is configured to toggle through channels and display the channels according to the input information. The device is used for toggling amongst the channels based on this information.

One embodiment is directed to a method of toggling between multiple television channels. The method includes receiving a list of two or more television channels with each of the channels having a different priority level, a first input of a first toggle trigger that causes channel switching, and a second input of a second toggle trigger that causes channel switching. The method also includes displaying a first channel on a display. While the first channel is being displayed, the method includes determining that the first toggle trigger has occurred, and switching the display from the first channel to a second channel. While the second channel is being displayed, the method includes determining that the second toggle trigger has occurred, and switching the display from the second channel to a third channel, with the third channel having a lower priority than the second channel.

The method may also include that at least one of the first and second toggle triggers is determining that the channel currently being displayed has been continuously displayed for a predetermined time interval.

The method may include that at least one of switching the display from the first channel to the second channel and switching the display from the second channel to the third channel automatically occurs upon the occurrence of the corresponding toggle trigger.

The method may include that at least one of the first and second toggle triggers is detecting a commercial on the channel that is currently being displayed.

The method may include that at least one of the first and second toggle triggers is detecting a vocal cue on the channel that is currently being displayed.

The method may further include determining that a commercial is not currently occurring on the next highest priority channel prior to switching from the channel that is currently being displayed.

The method may include that the first toggle trigger is different than the second toggle trigger.

The method may further include initially displaying the channel with the highest priority level.

The method may include displaying an advertising banner on the display concurrently with the second channel.

Another embodiment includes a method of toggling between multiple television channels. The method includes receiving a first input including a plurality of channels each with a different priority level, and a second input including at least one of a commercial toggle type and a vocal cue toggle type, with each of the toggle types including a toggle trigger. The method includes displaying one of the channels on a display. While the channel is being displayed, the method includes determining that one of the toggle triggers has occurred, and determining that the highest priority channel that is not being displayed meets a predetermined criteria. The method then includes switching the display to the highest priority channel.

The method may include that determining that one of the toggle triggers has occurred includes determining that a commercial is occurring on the displayed channel, and determining that the highest priority channel that is not being displayed meets a predetermined criteria includes determining that a commercial is not occurring on the highest priority channel that is not currently being displayed.

The method may include that determining that one of the toggle triggers has occurred includes determining that a vocal cue has occurred on the displayed channel, and determining that the highest priority channel that is not being displayed meets a predetermined criteria includes determining that a commercial is not occurring on the highest priority channel that is not currently being displayed.

The method may further include receiving a third input including at least one of a start time for performing the toggling, a duration of time for performing the toggling, and an end time to stop performing the toggling.

The method may further include receiving the first and second inputs through an infrared interface configured to receive signal from an infrared remote control.

The method may further include receiving the first and second inputs through a wireless interface configured to receive signals from a wireless network.

The method may further include receiving one or more words or sounds that is the toggle trigger for the vocal cue toggle type.

The method may further include displaying an advertising banner on the display concurrently with the highest priority channel.

Another embodiment is directed to a device to toggle between multiple television channels. The device includes a receiver to receive incoming signals that include a plurality of different television channels, and a user interface that receives inputs from a user including a priority level for at least two of the channels, at least one of a commercial toggle type and a vocal cue toggle type, and a toggle trigger for each of the toggle types. The device also includes a processor configured to send an output to display one of the channels on a display, determine that one of the toggle triggers has occurred while the channel is being displayed, determine that the highest priority channel that is not being displayed is not currently airing a commercial, and switch the display to the highest priority channel.

The device may include that the processor is configured to determine the occurrence of a commercial on the channel that is being displayed and on the highest priority channel that is not being displayed.

The device may further include a clock operatively connected to the processor with the processor further configured to switch the display from the current channel to one of the other channels after the current channel has been on the display for a predetermined time period.

The various aspects of the various embodiments may be used alone or in any combination, as is desired.

DETAILED DESCRIPTION

The present application is directed to a system and method of toggling between television channels that are displayed on a display. A listing of channels is received from a user, with the channels being prioritized in an order of preference. One or more toggle types are also received from the user, with each toggle type further including a toggle trigger. In use, a channel is displayed on the display until a toggle trigger is detected. Once detected, the channel on the display is changed to another channel from the list of channels. This process may continue with the detection of another toggle trigger causing another changing of the displayed channel.

Figure 1:
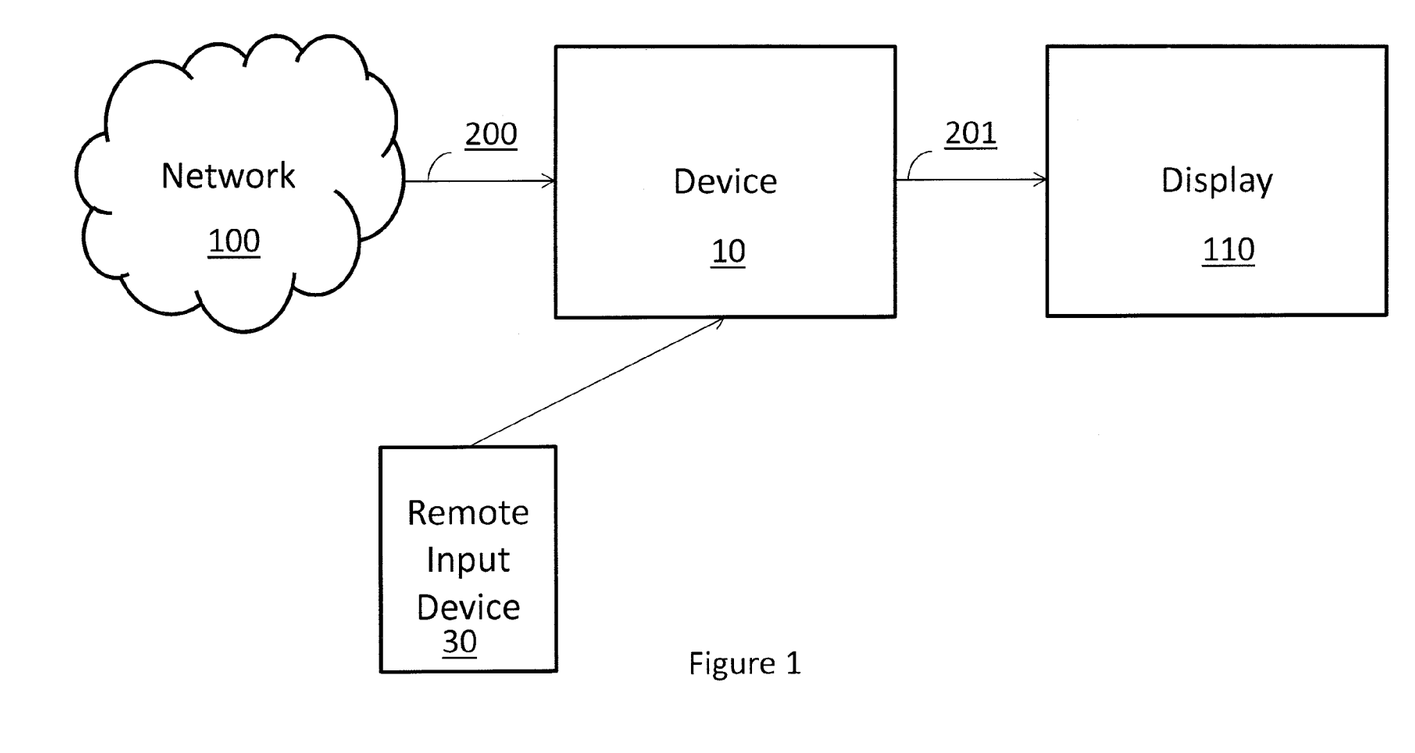
FIG. 1 is a schematic block diagram of a toggling device that receives media signals from a network and delivers display signals to a display.

FIG. 1 schematically illustrates a device 10 positioned relative to a network 100 and display 110. The device 10 is configured to receive multimedia signals from the network 100 and convert the signals into a content format that can be displayed on the display 110. The device 10 is further configured to receive input signals from a user through an input device 30 to control and/or configure toggling of the channels that appear on the display 110.

The network 100 broadly includes a variety of content sources that may include one or more of a cable provider, a satellite provider, broadcast television provider, and a data packet-based computer network (such as an Ethernet network). The network 100 transmits the media signals 200 that are received by the device 10. The term "media signals" should be broadly considered to include audio and/or video content, pictures, animations, text, etc.

The display 110 is used to view the content provided through the device 10. The display 110 may include various television-type displays (e.g., LCD screen, plasma screen, etc.). Display 110 may also include various other forms, including but not limited to a mobile device (tablet/smart phone), laptop, desktop monitor, exercise equipment (e.g., screen in treadmill or elliptical), and a console in a vehicle.

Figure 2:
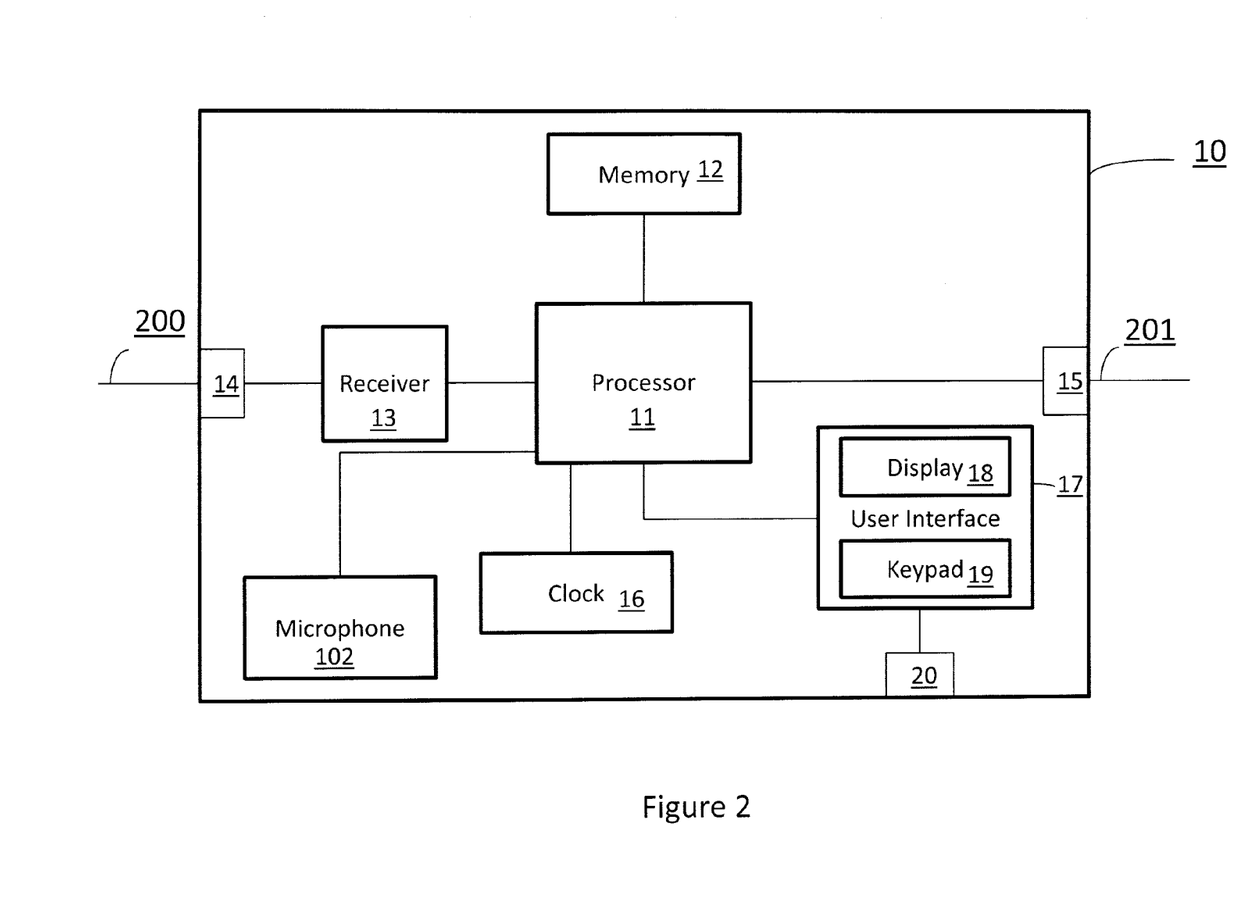
FIG. 2 is a block diagram of a device.

The device 10 functions to receive the media signals 200 from the network 100, convert the media signals 200 into content in a form that can be displayed, and deliver the corresponding signals 201 to the display 110 for viewing by a user. The device 10 may further enhance the source signal quality. A block diagram illustrating the functional elements of the device 10 is illustrated in FIG. 2.

The device 10 includes a processor 11 that controls the overall functioning of the device 10. The processor 11 may be configured to execute program code embodied within the device 10 to control the various elements and their functions. The processor 11 may be further configured to record one or more of the channels based on input from the user. Memory 12 is associated with the processor 11 to store the settings and associated criteria required for toggling between the channels. The device 10 may include various types of memory 12. The memory 12 may be only associated with the processor 11, or may be shared by one or more of the other components.

A receiver 13 receives the media signals 200 from the network 100. Receiver 13 may further include processing capabilities for processing the media signals. Alternatively, the processing may be performed by the processor 11. An interface 14 provides for an operative connection for receipt of the media signals 200. A second interface 15 provides for the processed signals 201 to be delivered to the display 110.

A clock 16 is associated with the processor 11 that measures the various timing requirements for specific events as will be explained in detail below. The clock 16 may be independent from the processor 11 as illustrated in FIG. 2, or may be incorporated within the processor 11.

Device 10 further includes a user interface 17 for receiving input from an input device 30 controlled by the user. The interface 17 may include a display 18, such as a LCD display, for displaying menu items and various other information to the user. A keypad 19 may include one or more keys may also be associated with the interface 17 to provide the user with a mechanism for entering the various inputs. A port 20 provides for receiving different types of user input.

The user interface 17 is configured to receive various different types of user input. In one embodiment, the keypad 19 provides for the user to directly enter the inputs into the device 10 (i.e., without the use of an input device 30). Another embodiment includes the input device 30 having a wired connection through the port 20. Another embodiment features the port 20 including an infrared receiver configured to receive infrared signals from an infrared remote control device 30. Still another embodiment includes the interface 17 and port 20 being configured to receive signals through a wireless network, such as those operating in according with the 802.11 networking protocols. These kinds of networking arrangements are commonly referred to as "Wi-Fi" local area networks. The establishment of such a network enables the interfacing of remote devices 30, such as laptop computers, cellular phones, PDAs, etc. The user interface 17 may further be configured to receive signals from two or more different types of input devices 30. The user interface 17 may also provide for the device 10 to save and/or access information stored on the network, such as a remote database used to store one or more of the inputs.

The device 10 may also include a microphone 102 for detecting audio sounds. The device 10 may also include audio processing functionality to process voice data for communications through the microphone 102. The audio processing may be performed by the processor 11, or by a separate communications circuit (not illustrated).

The device 10 is configured to receive inputs from the user to control the channels that appear on the display 110. The inputs include multiple channels that the user desires to watch on the display 110. The channels are each ranked with a priority, with one of the channels being assigned a highest priority and another one of the channels being assigned a lowest priority. By way of example, a user may be a sports enthusiast. This user may include ESPN as their highest priority channel, FoxSportsChannel as their second highest priority channel, and then the NFL Network as their third or lowest priority channel. The device 10 may be configured to receive any number of channels selected by the user. In one embodiment, the user enters the channel number that corresponds to the specific channel. Using the example from above, the user would enter "31" to indicate ESPN, "49" to indicate FoxSportsChannel, and "1498" to indicate the NFL Network.

The device 10 is further configured to receive inputs from the user indicating the toggle type that causes the displayed channel to be changed. Toggle types may include one or more of an elapsed time interval, the occurrence of a commercial on the displayed channel, and the occurrence of a predetermined vocal cue on the displayed channel. For one or more of these toggle types, the user further inputs a toggle trigger. For the elapsed time interval, the user inputs the amount of time that each channel should be continuously displayed prior to switching channels. For the predetermined vocal cue, the user inputs one or more vocal words, sounds, or phrases (hereinafter vocal sounds) that will cause a change in the displayed channel.

The device 10 may be configured to query the user regarding the various inputs necessary to provide the desired channel toggling. In one embodiment, the user provides an input indicating the desire to implement channel toggling. The device 10 receives the input and provides an input screen and/or sequence for inputting the relevant information. The device 10 may display this information on the display 18 located on the device 10, or may display the information on the display 110. The input sequence may provide for the user to input the desired channels, the priority for each of the channels, and one or more toggle types. Additional input may be necessary for one or more of the toggle types, such as the time duration for the time interval option, and the vocal sound (s) for the vocal cue option. The toggle triggers may correspond to specific options that are listed on the input screen. By way of example, the device 10 may provide for time interval options of 5 minutes, 10 minutes, or 15 minutes (i.e., these are the only options for the user). In some embodiments, the user may be able to input any information that they desire (e.g., a time interval of 3 minutes, the word "halftime"). The user may also input one or more of the start date and time for performing the toggling function, the end time to stop the toggling function, and the time duration for the toggling function. This information as illustrated in FIG. 3 is stored internally in the device memory 12 and/or remotely in a database, and is accessed by the device 10 during the toggling process.

Figure 3:
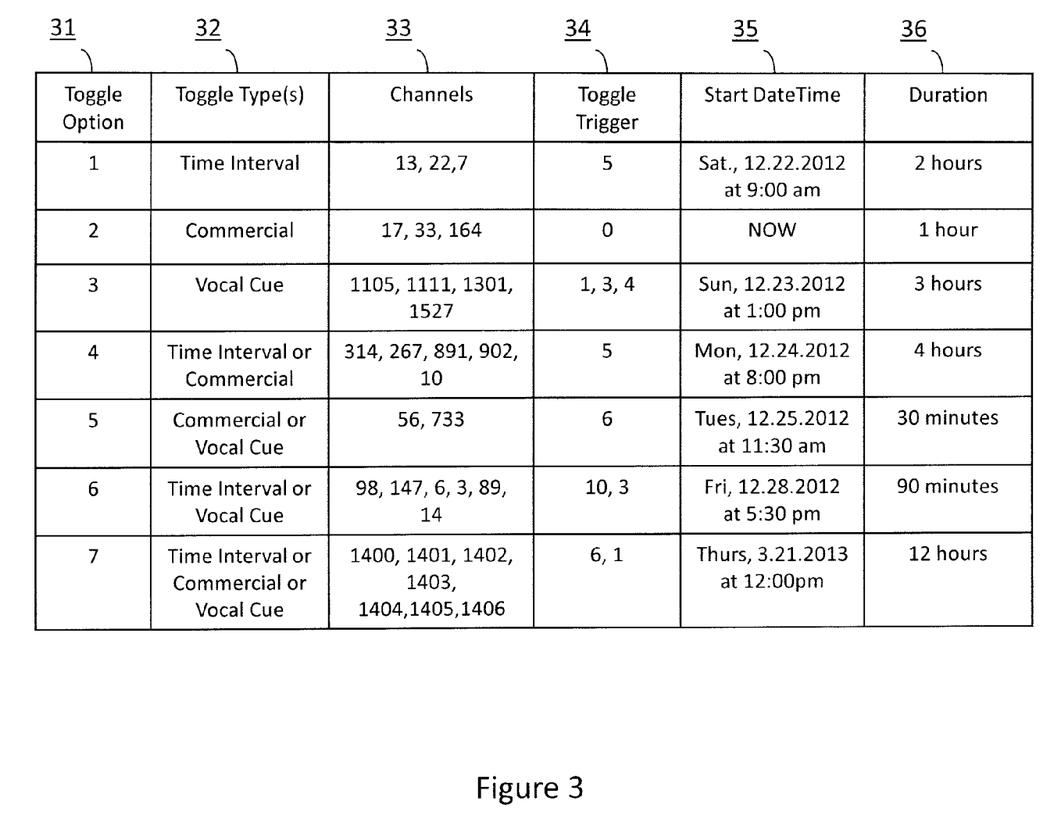
FIG. 3 is a schematic diagram of toggle options stored by a device.

FIG. 3 illustrates an example of the information regarding a toggling process for a user that is stored in the device 10. The information may include the one or more toggle options 31, each with one or more toggle types 32, the channels 33 listed in order of priority, one or more applicable toggle triggers 34, a start date and time 35, and a duration time 36.

The device 10 stores the information for use by the user. Once the user has input the relevant information at a first time period, the user may be able to access the listing and select a toggle option 31. The toggle options 31 may be identified by various alphanumeric characters of a predetermined maximum length. The user may set up multiple toggle options 31 to accommodate different types of television events. For example, the user may set up one or more first toggle options 31 that correspond to sporting events. The inputted information may include toggle types and toggle triggers more applicable to these types of events. By way of example, the user may include vocal cues of "halftime", "kickoff", "overtime", and "start of the game" for sporting events. The user may also set up one or more toggle options 31 for non-sporting events, such as sitcoms. The user may input different toggle triggers for these events, such as a time interval of 30 minutes.

As illustrated in FIG. 3, the toggle options 31 may include a single toggle type 32. The toggle options 31 may also include combinations of two or more different toggle types 32.

In one embodiment, the toggle triggers 34 may be assigned an arbitrary value that corresponds to the input options available to the user when entering the information. By way of example, the vocal cue option stored in row three includes toggle triggers 1, 3, and 4. Toggle trigger one may correspond to the word "commercial", toggle trigger three may correspond to the phrase "we'll be right back", and toggle trigger four may correspond to "break". Another example is row two with a toggle trigger 0 which may correspond to "commercials" as the toggle trigger. The toggle triggers may also be stored as the values that they represent (e.g., vocal cue toggle trigger stored as "halftime").

The user may also input the applicable time for the toggling process as illustrated in column 35. This may include the date and time when the specific toggling option is to occur. This may also include the end time.

As illustrated in FIG. 3, the starting information may also be configured as "NOW". This includes that the corresponding toggle option 31 is immediately effective once it has been saved. Once saved, "NOW" will be converted to the current date/time value at the time the option is saved.

Multiple different toggle options 31 include a start time of "NOW". This may be applicable if the toggle options are associated with different displays 110 within a residence or place of business. One example is for a home that includes multiple different television sets. The different toggle options may apply to the different displays 110.

The device 10 stores this information in its memory 12, or at an accessible remote location on the network. In one embodiment, the information is stored in one or more remote databases that is accessed through the user interface 17 or accessed through another interface incorporated with the device 10.

In one embodiment, the device 10 will automatically switch to the toggling process at the inputted start time. This may occur only in the event that the device 10 is active, which may include that the display 110 is currently on, or if the user has selected to record one or more channels during a particular time that overlaps with the time for one of the toggling options. In one embodiment when the display 110 is on at the time one of the toggling option starts, the device 10 may provide an indication to the user that the toggling option has started. This may include one or more of a message that appears on the display 110 or device display 18, or may use an audio indication.

In one embodiment when the display 110 is on at the start of a toggle option, the device 10 may change the display 110 from a current channel that is being displayed to the first channel listed in the toggling option. By way of example, if the user is currently watching channel 3 at the time the toggle option starts, the device 10 may automatically switch the channel to channel 5 which is the first channel indicated for the particular option. In another embodiment, the device 10 may prompt the user whether to change the channel at the start of the toggling option prior to changing the displayed channel.

The toggling process continues throughout the duration entered by the user. The various channels will be toggled during this time. At the end of the duration, the toggling process ends. In one embodiment, the channel that is currently displayed at the time that process ends will continue to be displayed. In one embodiment, an indication, such as a message on the display 110 or display 19, may be shown to inform the user that the toggle process has terminated.

Figure 4:
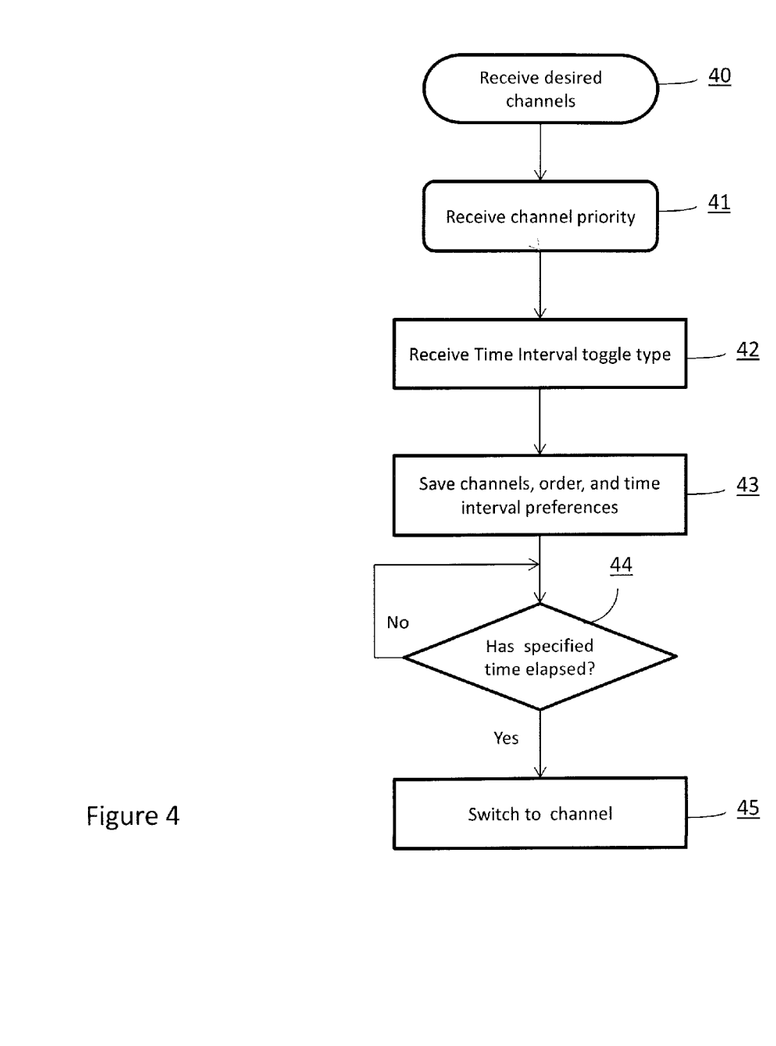
FIG. 4 is a flowchart diagram of a time interval channel toggle process.

FIG. 4 illustrates a toggle process based on time intervals between channel changes. The time intervals include how long each channel will be continuously displayed prior to the channel being changed. For example, if 15 minutes is specified, then the device 10 will switch to the next channel in the list after 15 minutes has elapsed. The process includes receiving the desired channels (step 40), the priority for each channel (step 41), and the time interval toggle option (step 42). This information is saved (step 33) by the device 10, either locally or remotely as described above.

The device 10 initially displays the channel with the highest priority. The device 10 monitors the length of the time that the first channel has been displayed. Once the specified time has elapsed (step 44), the device 10 switches to the channel with the next highest priority (step 45). The process continues with each of the channels being displayed for the predetermined time interval. Once each channel has been displayed, the device 10 may start again with the highest priority channel being displayed. Alternatively, the device 10 may stop the toggle process and continuously display one of the channels (e.g., the highest priority channel).

In one embodiment, the amount of remaining time for a particular channel may be displayed on the display 110. The remaining time may appear in a non-conspicuous location, such as along an outer portion of the display such that it does not distract from the user's ability to see the channel on the display 110. The time may appear for the entire duration, or may appear only in proximity to when the device 10 is to toggle to the next channel (e.g., the last minute of a ten minute interval). The user may be able to over-ride the channel toggling at the end of the duration by entering an input to the device 10. The input may cause the channel to be displayed for an additional amount of time, or may stop the toggle process until the user enters a second input to restart the toggle process. By way of example, if the current channel is a football game the user may want to continue to watch the game and not toggle to the next channel. The user is then able to enter an input to stop or delay the toggle to the next channel. In one embodiment, the device 10 will automatically toggle to the next channel unless an input is received from the user.

Figure 5:
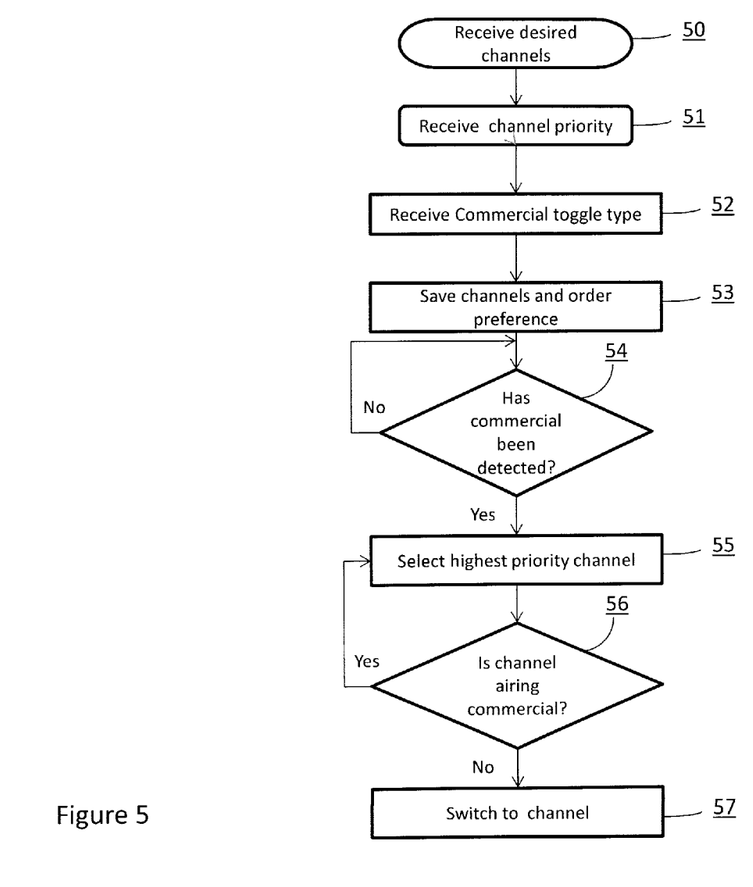
FIG. 5 is a flowchart diagram of a commercial channel toggle process.

FIG. 5 illustrates another single toggle option based on the occurrence of a commercial. This toggle option provides for the device 10 to change to another channel upon detecting a commercial on the displayed the channel. The channels are toggled such that the highest priority channel without a commercial is displayed. As illustrated in FIG. 5, the process includes receiving inputs from the user regarding the desired channels (step 50), the priority of the channels (step 51), and the commercial toggle option (step 52). This information is saved by the device (step 53).

The device 10 may initially display the highest priority channel. The device 10 then determines whether a commercial has been detected on the channel that is being displayed (step 54). If a commercial is detected, the next highest priority channel is selected (step 55). If a commercial is not detected on the next channel, then the device 10 switches to display the next channel (step 57). If the next channel is also airing a commercial, the device 10 determines whether a commercial is being aired on the channel with the next highest priority. The device 10 continues through the channel list until it finds a channel that is not airing a commercial and switches the display 110 to that channel. If each of the channels on the list is airing a commercial, the device 10 may continue to display the current channel. Alternatively, the device 10 may display the highest priority channel.

In this embodiment, at least one of the processor 11 and receiver 13 of the device 10 can detect a commercial on the current channel or one of the possible upcoming channels through various software programs. The device 10 may be configured to analyze the channel information from the incoming signals 200 looking for fades to black and changes in closed captioning data. One example of a system that detects for commercials includes ReplayTV.

In one embodiment, the device 10 detects a commercial on the current channel. Once detected, the current channel's status (or flag) is changed accordingly—for example, the status (or flag) may be set to "airing commercial." Subsequently, the status (or flag) of the highest priority channel is checked. If the status is not "airing commercial," then the device 10 will change the channel and begin showing content on the display 110 from the highest priority channel. If the status is "airing commercial," then the check will be performed on the second highest priority channel. If all channels specified are in the "airing commercial" state, then the display will remain on the current channel. However, when one of the channels configured for the toggle option is no longer in the "airing commercial" state, the display 110 will be switched to that channel.

In this embodiment, the device 10 will attempt to change to the channel with the highest priority. By way of example, assume channel 1 is the highest priority, channel 2 is the second highest priority, and channel 3 is the third highest priority. If the device is currently displaying channel 2 and a commercial is detected, the device 10 will attempt to change to channel 1 (i.e., the highest priority channel on the list). In the event channel 1 is also airing a commercial, then the device 10 will attempt to change to channel 3 (i.e., the third priority channel).

Figure 6:
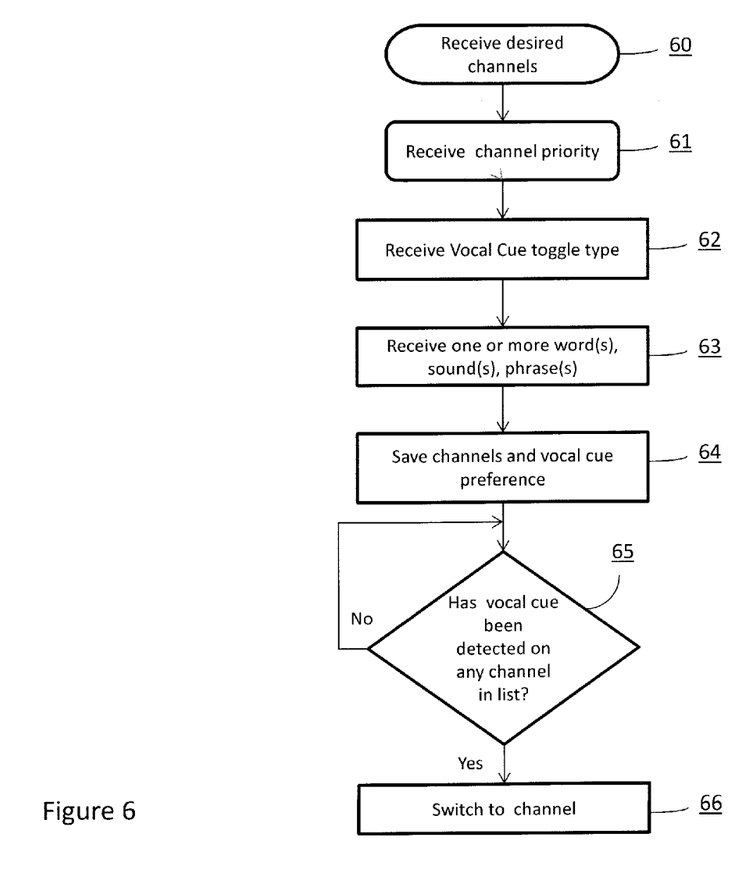
FIG. 6 is a flowchart diagram of a vocal cue commercial toggle process.

A vocal cue toggle process is disclosed in FIG. 6. This process switches channels after a vocal sound has been detected on the current channel. For this process, at least one of the processor 11 and receiver 13 include audio processing circuitry configurable to detect the occurrence of specific words or phrases.

The device 10 is configured to receive a vocal sound cue when the user initializes the vocal cue toggle option. In one embodiment, the user speaks or otherwise makes the desired vocal sound which is detected by the device 10 through the microphone 102. Another embodiment includes the vocal sound can being recorded by the user using a digital video recording device. In another embodiment, the device 10 includes a number of predefined sounds in memory 12. When the user selects the vocal cue option, the device 10 displays in writing the predefined sounds from which the user can select one or more. The device 10 may also provide for the input of sound cues using two or more of these options. Once the user selects the one or more vocal cues, the device 10 saves and associates the information with the users toggle option.

Once the vocal cues are stored and the toggle option is initiated, the device 10 analyzes the audio portion of the signals 200. Embodiments for detecting vocal cues within an audio stream include software such as Audacity, WavePad, and Adobe Audition. Once the cue event has occurred on the current displayed channel, the device 10 acts. In one or more of these, the software is configured to separate vocals and the music/instrument. If a user wanted to use either spoken words or sounds played from a recording, this software would provide the ability to capture it.

Various vocal sounds may be input by the user as the desired vocal cues. A few examples include but are not limited to "halftime", "break", "welcome back to our coverage of the 2012 Summer Olympics," "This is the NCAA tournament on CBS," or a well known sound sequence associated with a TV program.

As illustrated in FIG. 6, the process includes receiving the desired channels (step 60), the channel priorities (step 61), the vocal cue option (step 62), and one or more vocal sounds (step 63) which are saved by the device (step 64).

The device 10 initially displays a first channel. This may include the highest priority channel on the list, a channel selected by the user, or whatever channel is being displayed at the time the toggle option starts. The device 10 than processes the audio of the displayed channel to determine whether the vocal cue has occurred (step 65). If the vocal cue has occurred, the channel is switched to the highest priority channel (step 66).

The vocal cue option may also include additional steps of preventing changing to a channel that is currently airing a commercial. If this next channel is airing a commercial, the channel will be passed for the next highest priority channel.

The various channel toggle options may be used individually as described above. Further, two or more of the toggle options may be combined together, such as toggle options 4-7 illustrated in FIG. 3. When multiple toggle types are selected, the device 10 will change the channel when either one of the toggle conditions is met. For example, if "Time Interval or Commercial or Vocal Cue" has been selected, then the next channel change will happen upon the occurrence of the first one of a time interval elapsing, detecting a commercial, and detecting a vocal cue.

Figure 7:
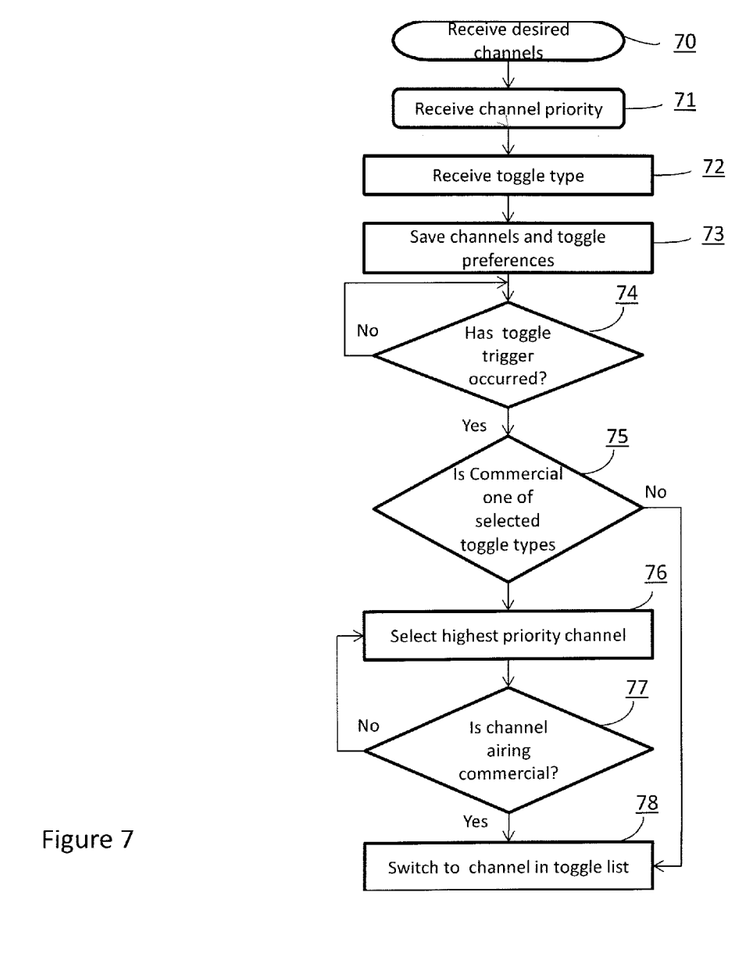
FIG. 7 is a flowchart diagram of a combination commercial and vocal cue toggle process.

FIG. 7 illustrates the steps of one process with multiple different toggle types. In this embodiment, the combination of "Time Interval or Commercial" has been chosen. The channel will switch when either one of the criterion has been met. The process includes receiving the desired channels (step 70), channel priorities (step 71), and the toggle types (step 72) which are saved by the device 10 (step 73). The process begins with displaying a channel on the display 110. While the channel is being displayed, the device 10 determines whether one of the toggle events has occurred (step 74). If the event has not occurred, the channel will continue to be displayed. If one of the events has occurred, the device 10 checks to determine if the commercial toggle option has been detected (step 75). If the commercial option has not been selected, then the device 10 changes the channel (step 78). This channel may be the highest channel on the user's priority, or may be the next channel in the list.

If the commercial toggle option has been selected, the device 10 determines the highest priority channel (step 76) and determines whether this next highest priority channel is airing a commercial (step 77). If the next highest priority channel is not airing a commercial, the device 10 will change and display that channel (step 78). If the next highest priority channel is also airing a commercial, the device 10 will check the next channel on the list. If a commercial is detected, the device 10 will continue through the user's channel list in the priority order until a channel is detected that is not airing a commercial and will change to that channel. If each of the channels on the list is airing a commercial, the device 10 may continue to display the current channel. Alternatively, the device 10 may display the highest priority channel.

Figure 8:
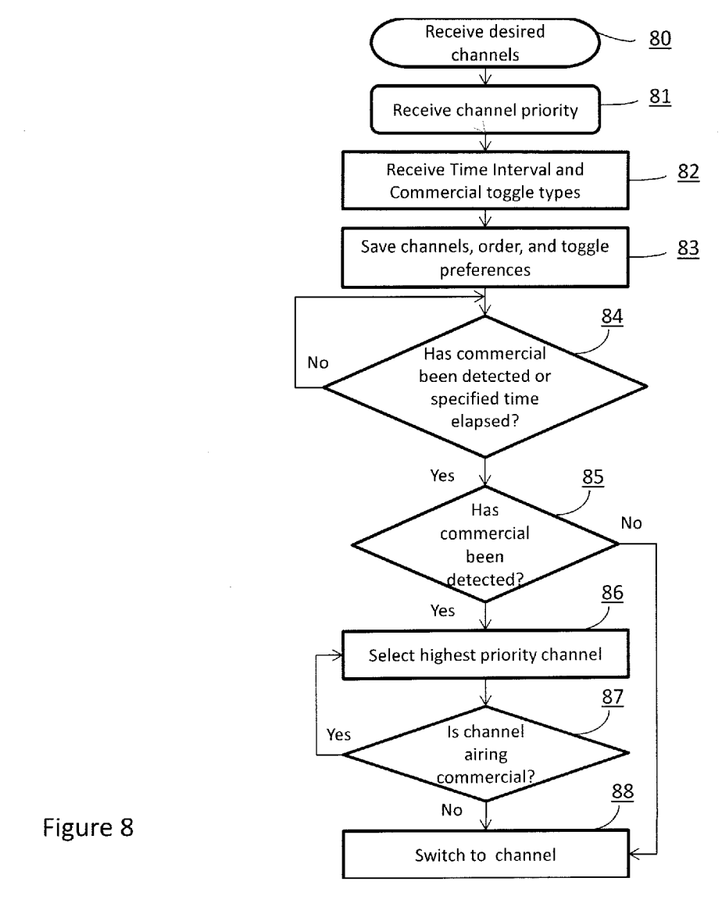
FIG. 8 is a flowchart diagram of a combined commercial and time interval channel toggle process.

FIG. 8 includes another embodiment with multiple toggle types. In this embodiment, the user has selected the time interval and commercial toggle options. The device 10 receives the desired channels (step 80), channel priorities (step 81), and the toggle types (step 82) which are saved by the device 10 (step 83). The device 10 then determines that one of the toggle triggers has occurred (step 84). In this embodiment, the device 10 then determines whether the toggle trigger is a commercial (step 85). If it is not a commercial, then the toggle trigger is the time interval trigger and the channel will be changed. If it is a commercial trigger, the device 10 determines the highest priority channel that is not currently being displayed (step 86) and determines whether his next channel is airing a commercial (step 87). If this next channel is not airing a commercial, the device 10 will change the display that that channel (step 88). If that next channel is also airing a commercial, the device will determines the next highest priority channel and determine whether there is a commercial. This process continues until it is determined that each of the channels on the list is airing a commercial, at which time the device 10 may continue to display the current channel, or may display the highest priority channel.

Figure 9:
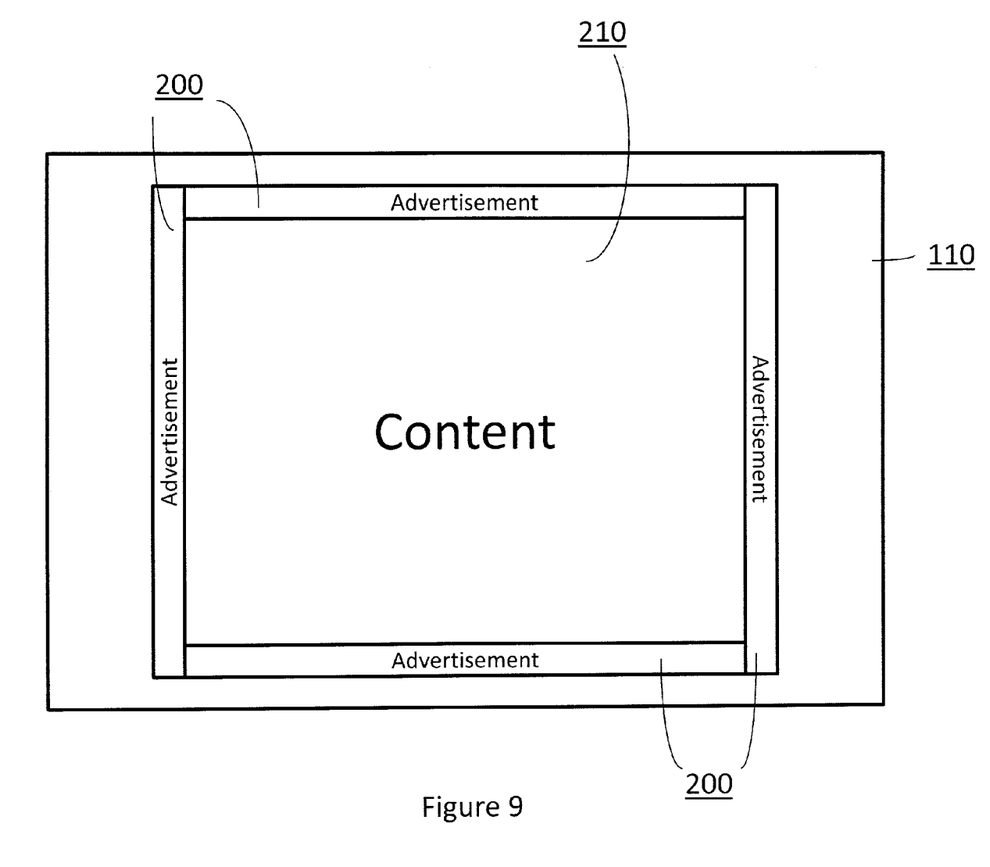
FIG. 9 is a schematic diagram of advertisements being displayed with a channel on a display.

In the various embodiments, the device 10 may further be configured to cause one or more advertisements 200 to appear on the display 110 while displaying the various channels. The advertisements 200 may be stored in the device 10, either internally or remotely, and streamed to the display 110 as an output signal 201. The advertisements provide information to the user which may otherwise not be available due to the nature of the toggling process.

Broadcasting companies are compensated for showing advertisements on their TV stations. The more popular the TV program, potentially the more advertisers are willing to pay for these to be aired during a particular time slot. The commercial toggle option may appear to circumvent these advertisements. Therefore, the device 10 may be configured to include one or more advertisements 200 to promote revenue sharing. This embodiment is particularly pertinent when streaming content over the World Wide Web.

FIG. 9 illustrates one embodiment of the advertisements 200 that appear on the display 110. The advertisements 200 may be positioned away from or along the border of the channel content 210 to prevent viewing disruption. The advertisements 200 may include a variety of different formats, including a static image, a scroll bar, or a separate video component.

The one or more advertisements 200 may be displayed in various manners. In one embodiment, the advertisements 200 may appear continuously while the toggling process is active. In another embodiment, the advertisements 200 may appear for a first time period when a channel initially appears on the display 110. In another embodiment, the advertisements 200 appear when the toggle process is initially started. Another option includes displaying the advertisements when a toggle event occurs. Other options for displaying the advertisements 200 include immediately after the channels and preferences have been saved, while determining if the next highest preferred channel should be displayed, or after the channel to display has been selected.

The advertisements 200 may remain when displayed at the time the channel is switched. Alternatively, the advertisements 200 may change when the channel is switched.

The displaying of advertisements is particularly applicable to the commercial type toggle option. However, the advertisements may also be display in the other toggle options.

One embodiment of the disclosed toggling system is for use when viewing sporting events being aired simultaneously of multiple channels. A similar implementation could be applied to out-of-market sports packages such as the National Basketball Association (NBA) League Pass and National Football League (NFL) Sunday Ticket. For this type of content (and perhaps most sports fans in general), the "Commercial" and/or "Vocal Cue" trigger types (or combination of the two) may be desirable.

In one embodiment, the occurrence of a toggle trigger causes an automatic toggle of the channel on the display 110. By way of example, the occurrence of a particular vocal cue or an elapsed time will cause the automatic toggling of the current channel. In other embodiments, the toggling may not occur automatically. One example is upon the occurrence of a commercial in the current channel, the channel may not automatically toggle unless another channel in the prioritized list is available that is not currently airing a commercial.

In one use, various persons of a household may each include their own personalized toggle option. For example, a child may include a first toggle option that applies to watching cartoons on Saturday morning. Another person may include a second toggle option for watching football on Sunday afternoon. A third person may include a third toggle option for watching sitcoms on weekday evenings.

In a household with multiple children, each child may want to watch a different TV program. To satisfy every child's request, one embodiment would be to use the "Time Interval" trigger type, where the time limit for each channel is 30 minutes. This would allow the parent (or child, if permitted) to save the channel list and trigger preferences. Therefore, alleviating sibling quarrels and frustration of parents while simultaneously enhancing viewing experience.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of toggling between multiple television channels, the method comprising:
   receiving a list of two or more television channels with each of the channels having a different priority level;
   receiving a first input of a first toggle trigger that causes channel switching;
   receiving a second input of a second toggle trigger that causes channel switching;
   saving the first and second toggle triggers;
   after receiving the first and second inputs, displaying a first channel on a display;
   while the first channel is being displayed, determining that the first toggle trigger has occurred;
   responsive to determining that the first toggle trigger has occurred, switching the display from the first channel to a second channel without receiving additional input regarding the first toggle trigger while a first non-commercial program on the first channel appears on the display and prior to a first commercial on the first channel appearing on the display;
   while the second channel is being displayed, determining that the second toggle trigger has occurred; and
   responsive to determining that the second toggle trigger has occurred, switching the display from the second channel to a third channel without receiving additional input regarding the second toggle trigger while a second non-commercial program on the second channel appears on the display and prior to a second commercial on the second channel appearing on the display, the third channel having a lower priority than the second channel.

2. The method of claim 1, wherein at least one of the first and second toggle triggers is determining that the channel currently being displayed has been continuously displayed for a predetermined time interval.

3. The method of claim 1, wherein at least one of switching the display from the first channel to the second channel and switching the display from the second channel to the third channel automatically occurs upon the occurrence of the corresponding toggle trigger.

4. The method of claim 1, wherein at least one of the first and second toggle triggers is detecting a commercial on the channel that is currently being displayed.

5. The method of claim 1, wherein at least one of the first and second toggle triggers is detecting a vocal cue on the channel that is currently being displayed.

6. The method of claim 1, further comprising verifying a commercial is not currently occurring on the next highest priority channel prior to switching from the channel that is currently being displayed.

7. The method of claim 1, wherein the first toggle trigger is different than the second toggle trigger.

8. The method of claim 1, further comprising initially displaying the channel with the highest priority level.

9. The method of claim 1, further comprising displaying an advertising banner on the display concurrently with the second channel.

10. A method of toggling between multiple television channels, the method comprising:
receiving a first input including a plurality of channels each with a different priority level;
receiving a second input including a time interval toggle type and a vocal cue toggle type, the toggle types including different toggle triggers with the time interval toggle trigger including an amount of time to continuously display one of the channels and the vocal cue toggle trigger including at least one word, sound, or phrase;
after receiving the first and second inputs, displaying one, of the channels on a display;
while the channel is being displayed, determining that one of the toggle triggers has occurred;
determining that the highest priority channel that is not being displayed meets a predetermined criteria; and
switching the display to the highest priority channel that is not being displayed.

11. The method of claim 10, wherein determining that one of the toggle triggers has occurred includes determining that a vocal cue has occurred on the displayed channel prior to a commercial occurring on the displayed channel, and determining that the highest priority channel that is not being displayed meets a predetermined criteria includes determining that a commercial is not occurring on the highest priority channel that is not currently being displayed.

12. The method of claim 10, further comprising receiving a third input including at least one of a start time for performing the toggling, a duration of time for performing the toggling, and an end time to stop performing the toggling.

13. The method of claim 10, further comprising receiving the first and second inputs through an infrared interface configured to receive signals from an infrared remote control.

14. The method of claim 10, further comprising receiving the first and second inputs through a wireless interface configured to receive signals from a wireless network.

15. The method of claim 10, further comprising receiving one or more words or sounds that is the toggle trigger for the vocal cue toggle type.

16. The method of claim 10, further comprising displaying an advertising banner on the display concurrently with the highest priority channel.

17. A device to toggle between multiple television channels, the device comprising:
a receiver to receive incoming signals that include a plurality of different television channels;
a user interface that receives inputs from a user including a priority level for at least two of the channels, a time interval toggle type and a vocal cue toggle type, and a toggle trigger for each of the toggle types with the time interval toggle trigger including an amount of time to continuously display a channel and the vocal cue toggle trigger including at least one word sound, or phrase;
a processor configured to:
send an output to display one of the channels on a display;
based on the received inputs from the user regarding the toggle triggers, determine that one of the toggle triggers has occurred while the channel is being displayed;
determine that the highest priority channel that is not being displayed is not currently airing a commercial; and
switch the display to the highest priority channel that is not being displayed.

18. The device of claim 17, wherein the processor is configured to determine the occurrence of a commercial on the channel that is being displayed and on the highest priority channel that is not being displayed.

19. The device of claim 17, further comprising a clock operatively connected to the processor with the processor further configured to switch the display from the current channel to one of the other channels after the current channel has been on the display for a predetermined time period.

20. The device of claim 17, further comprising switching the channel that is currently being displayed without displaying a commercial that occurs on the channel.

* * * * *